(12) United States Patent
Ozeki et al.

(10) Patent No.: US 6,882,693 B2
(45) Date of Patent: Apr. 19, 2005

(54) DIGITAL SIGNAL RECEIVER

(75) Inventors: Hiroaki Ozeki, Osaka (JP); Masami Takigawa, Osaka (JP); Hitonobu Furukawa, Osaka (JP); Junichi Fukutani, Aichi (JP); Kazuyori Domoto, Aichi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 647 days.

(21) Appl. No.: 09/735,630

(22) Filed: Dec. 14, 2000

(65) Prior Publication Data

US 2001/0006542 A1 Jul. 5, 2001

(30) Foreign Application Priority Data

Dec. 14, 1999 (JP) .................................. 11-354303

(51) Int. Cl.[7] .......................... H04L 27/08; H03D 1/04
(52) U.S. Cl. ................................. 375/345; 375/346
(58) Field of Search ........................... 375/348, 346, 375/345, 375, 332; 370/289

(56) References Cited

U.S. PATENT DOCUMENTS

| | | | |
|---|---|---|---|
| 4,355,304 A | * 10/1982 | Kasuga et al. | 341/75 |
| 4,364,093 A | * 12/1982 | Holmes | 348/614 |
| 5,375,145 A | * 12/1994 | Abbott et al. | 375/345 |
| 5,694,388 A | * 12/1997 | Sawahashi et al. | 370/206 |
| 6,032,031 A | * 2/2000 | Takaki | 455/245.2 |
| 6,118,499 A | * 9/2000 | Fang | 348/726 |
| 6,400,758 B1 | * 6/2002 | Goldston et al. | 375/216 |
| 6,631,171 B1 | * 10/2003 | Kawai | 375/332 |
| 6,643,321 B1 | * 11/2003 | Genossar et al. | 375/219 |

FOREIGN PATENT DOCUMENTS

JP 6-216955 8/1994

* cited by examiner

*Primary Examiner*—Amanda T. Le
*Assistant Examiner*—Cicely Ware
(74) *Attorney, Agent, or Firm*—McDermott Will & Emery LLP

(57) ABSTRACT

A digital signal receiver capable of obtaining a favorable receiving performance even if the input signal level changes rapidly is presented. A control voltage for controlling a variable gain amplifier is read by a microprocessor, and an operation-starting point of the variable gain amplifier is shifted by using this control voltage. As a result, a favorable level fluctuation response characteristic is obtained regardless of the input level.

16 Claims, 13 Drawing Sheets

DIGITAL SIGNAL RECEIVER

FIELD OF THE INVENTION

The present invention relates to a digital signal receiver used in digital transmission equipment.

BACKGROUND OF THE INVENTION

A conventional digital signal receiver for receiving a terrestrial wave broadcast transmitted with a digital modulation developed in the United States will be explained. FIG. 13 is a block diagram of this digital signal receiver.

In FIG. 13, a signal received by an antenna is fed into input terminal 101, and is controlled of its amplitude in variable gain amplifier 102. The output of amplifier 102 is mixed with a signal from local oscillator 110 in frequency converter 103, and is converted in frequency to a specified first intermediate frequency (for example, 1407.5 MHz). The output of frequency converter 103 is mixed with a signal from local oscillator 111 in frequency converter 105, and is converted in frequency to a second intermediate frequency (for example, 44 MHz), and is controlled of its amplitude by variable gain amplifier 104. The output of amplifier 104 is converted into a digital signal in analog-to-digital (A/D) converter 106.

Demodulator 107 demodulates the output of A/D converter 106. Equalizer 108 removes distortion due to ghost generated in a transmission line from the output of demodulator 107 and issues it from terminal 109. Level comparator 112 compares the output level of converter 106 with a reference value. The output of converter 106 is filtered by loop filter 113, and is fed into control voltage generator 114. Generator 114 controls the gains of variable gain amplifiers 102 and 104 so that the input level of converter 106 may be constant.

In this block diagram, before synchronism is achieved prior to demodulation, the filter bandwidth of loop filter 113 is broad, and the receiver responds to signal fluctuations at high speed. After the synchronism is established, by narrowing the filter bandwidth, i.e., narrowing a noise bandwidth, the noise characteristic after the synchronization is improved. A similar technology is disclosed, for example, in Japanese Laid-open Patent No. 6-216955.

The control voltage—gain conversion characteristic of the variable gain amplifier is not constant in relation to a control voltage. Therefore, such conventional receiver cannot follow to the level of an input signal fluctuation at high speed in a specific electric field intensity. For example, if an object passes in front of the antenna, and the level of the received signal changes suddenly, the response of the variable gain amplifier cannot follow to it, and a bit error rate degrades.

SUMMARY OF THE INVENTION

A digital signal receiver realizing a favorable receiving performance if the level of the input signal fluctuates at high speed is presented. In this digital signal receiver, an operation-starting point of a variable gain amplifier is shifted by a control voltage for controlling the variable gain amplifier.

DESCRIPTION OF THE PREFERRED EMBODIMENTS (Embodiment 1)

Figure 1:
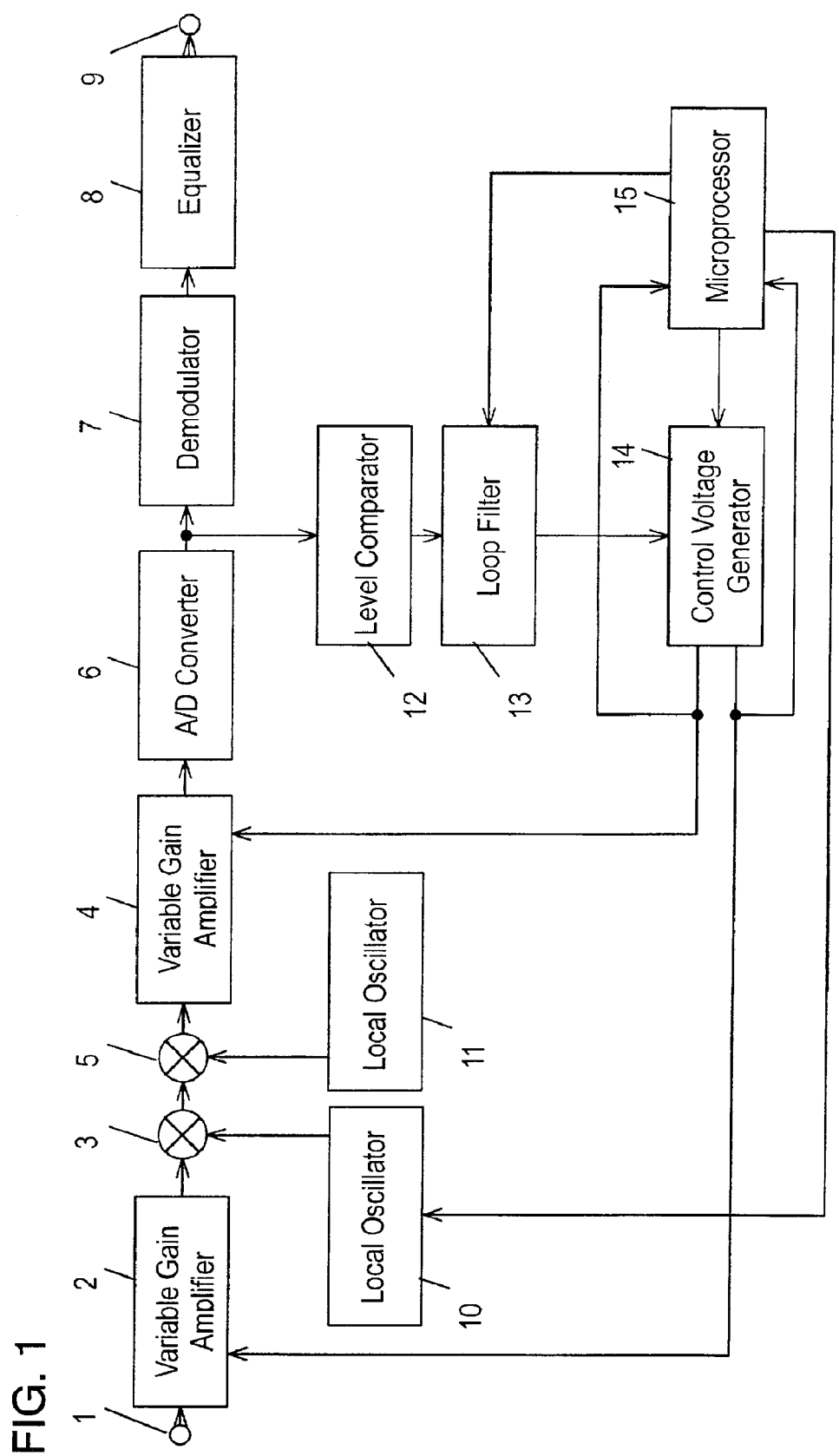
FIG. 1 is a block diagram of a digital signal receiver in embodiment 1 of the invention.
Figure 2A:
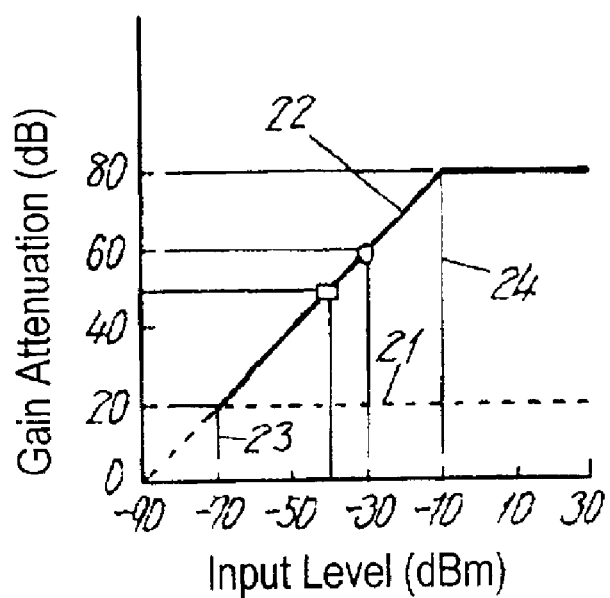
FIG. 2A shows the relation of a input level and a gain attenuation of a variable gain amplifier at a operation-starting point of −70 dBm in the digital signal receiver in embodiment 1 of the invention.
Figure 2B:
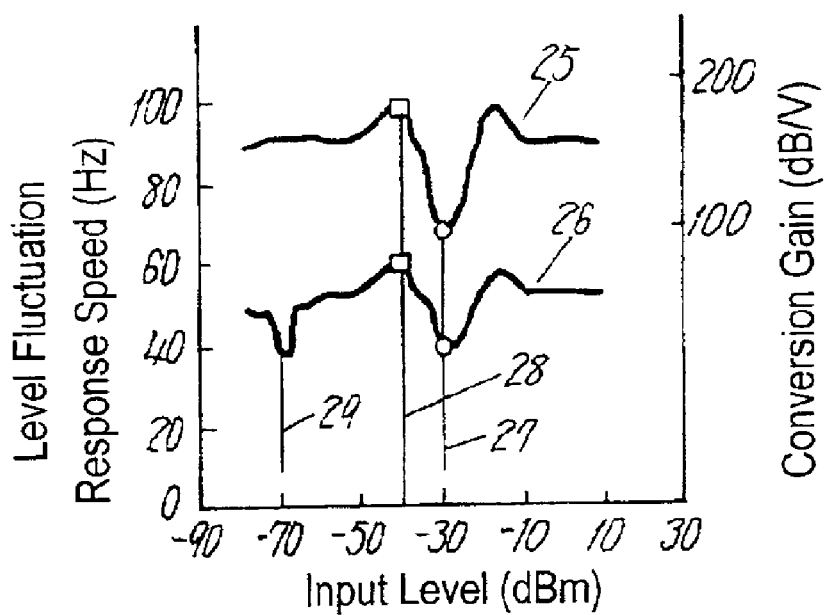
FIG. 2B shows the relation of an input level, a level fluctuation response speed, and a conversion gain at the operation-starting point of −70 dBm in the digital signal receiver in embodiment 1 of the invention.
Figure 3A:
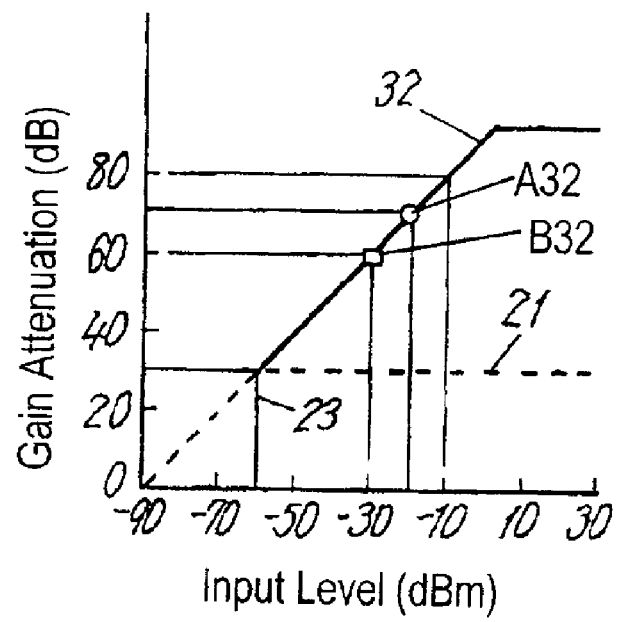
FIG. 3A shows the relation of an input level and a gain attenuation of a variable gain amplifier at the operation-starting point of −60 dBm in the digital signal receiver in embodiment 1 of the invention.
Figure 3B:
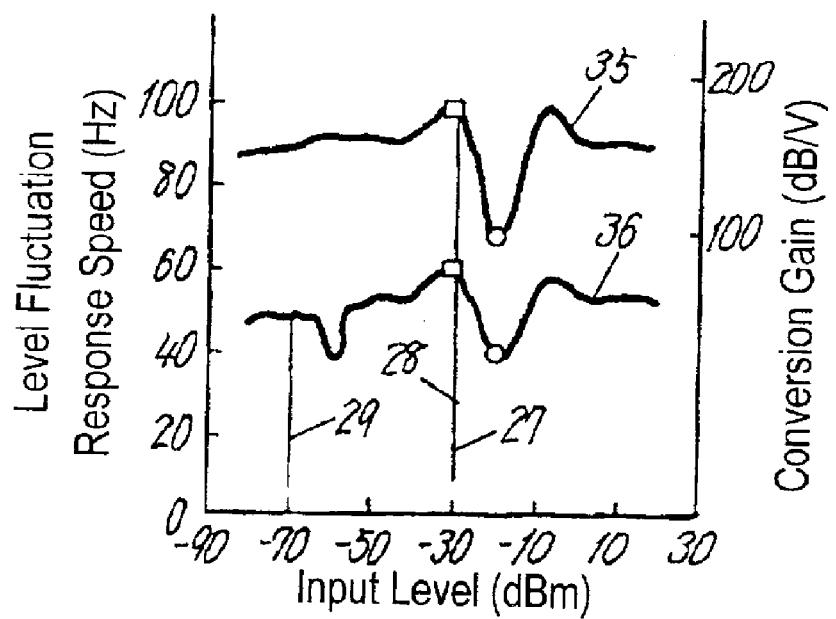
FIG. 3B shows the relation of an input level, a level fluctuation response speed, and a conversion gain at the operation-starting point of −60 dBm in the digital signal receiver in embodiment 1 of the invention.

FIG. 1 is a block diagram of a digital signal receiver according to embodiment 1 of the invention. FIG. 2A shows the relation of an input level to a gain attenuation at a operation-starting point of a variable gain amplifier of −70 dBm. FIG. 2B shows the relation of the input level to a conversion gain, and the input level to a level fluctuation response speed at the operation-starting point of the variable gain amplifier of −70 dBm. FIG. 3A shows the relation of the input level to the gain attenuation at the operation-starting point of the variable gain amplifier of −60 dBm. FIG. 3B shows the relation of the input level to the conversion gain, and input level to the level fluctuation response speed at the operation-starting point of the variable gain amplifier of −60 dBm.

In the following explanation, a level fluctuation amplitude is ±2 dB unless otherwise noted.

In FIG. 1, the digital signal receiver comprises input terminal 1 for receiving a digital modulation signal, variable gain amplifier 2 coupled to terminal 1, frequency converter 3 coupled to amplifier 2, local oscillator 10 coupled to converter 3, frequency converter 5 coupled to the output of frequency converter 3, local oscillator 11 coupled to converter 5, variable gain amplifier 4 coupled to the output of converter 5, A/D converter 6 coupled to the output of amplifier 4, demodulator 7 connected to the output of converter 6, equalizer 8 coupled to the output of demodulator 7, output terminal 9 coupled to the output of equalizer 8, level comparator 12 coupled to the output of A/D converter 6, loop filter 13 coupled to the output of comparator 12, and control voltage generator 14 coupled to the output of filter 13. Further, a first output of control voltage generator 14 is coupled to the control input of variable gain amplifier 2 and microprocessor 15. A second output of control voltage generator 14 is connected to the control input of variable gain amplifier 4 and microprocessor 15. A control terminal of local oscillator 10 is coupled to microprocessor 15.

The operation of the digital signal receiver having such configuration will be explained. A received signal with digital modulation is fed into input terminal 1, and controlled in amplitude in variable gain amplifiers 2 and 4, and fed into A/D converter 6 at a specified amplitude.

FIG. 2A shows gain attenuation 21 of variable gain amplifier 4 and gain attenuation 22 of variable gain amplifier 2. At the input level of −90 dBm, the gain attenuation of amplifiers 2 and 4 is 0 dB. When the input level is in a range of −90 dBm to −70 dBm, microprocessor 15 controls control voltage generator 14, so that the gain attenuation of amplifier 2 may be 0 dB. As the input level increasing, the gain attenuation of amplifier 4 increases accordingly.

The operation from −70 dBm to −10 dBm will now be explained. At a higher input level than specified level 23 (−70 dBm), microprocessor 15 controls control voltage generator 14 so that the control voltage for variable gain amplifier 4 may be constant. Even if the input level increases, the gain attenuation does not exceed 20 dB. As the input level further increasing, the gain attenuation of variable gain amplifier 2 becomes larger accordingly. Up to input level 24 (−10 dBm), as the input level increasing, the gain attenuation of amplifiers 2 and 4 varies accordingly, and a signal having a constant amplitude is fed into A/D converter 6.

Specified input level 23 is called an operation-starting point of variable gain amplifier 2 and is set by microprocessor 15. At a higher input level than −10 dBm, however, even if control voltage generator 14 changes the control voltage, the gain attenuation cannot be changed due to the dynamic range of variable gain amplifier 2. In this region, the bit error rate of the digital signal receiver is extremely impaired.

FIG. 2B shows the relation of the input level and conversion gain 25 of variable gain amplifier 2, and the relation of the input level and level fluctuation response speed 26. Herein, the operation-starting point of variable gain amplifier 2 is −70 dBm like in FIG. 2A.

The conversion gain of variable gain amplifier 2 is expressed as (Change of Gain Attenuation)/(Change of Control Voltage). Since semiconductors like a diode and a transistor used in variable gain amplifier 2 have a nonlinear characteristic for the control voltage, the conversion gain changes significantly in response to the control voltage. On the other hand, since variable gain amplifier 4 is controlled at a different control voltage to a different input level, the conversion gain 25 changes so much in response to the input level. For example, when an object passes in front of the antenna, the input signal level fluctuates. Level fluctuation response speed 26 shows how fast the digital signal receiver can respond to the input signal level fluctuation, not deteriorating in the bit error rate, at each input level.

In the electric field at conversion gain 25 of low value in FIG. 2B, level fluctuation characteristic 26 is also poor. For example, at input level 27 of −30 dBm, the conversion gain is 100 dB/V, which is poor as compared with other input levels, and hence the level fluctuation response speed is also poor at 40 Hz. Since the operation-starting point of variable gain amplifier 2, i.e., −70 dBm is known, the present input level can be calculated by microprocessor 15 from the control voltages for variable gain amplifiers 2 and 4. When detecting the input level of −30 dBm, microprocessor 15 controls control voltage generator 14 to shift the operation-starting point of amplifier 4 to −60 dBm.

FIG. 3A shows the gain attenuation after shifting the operation-starting point to −60 dBm. As the point increases by 10 dB, in the region after the operation-starting of variable gain amplifier 2, the gain attenuation of variable gain amplifier 4 increases by 10 dB. And the gain attenuation corresponding to the same input level of variable gain amplifier 2 hence decreases by 10 dB. As a result, At the input level of −30 dBm, the operation point corresponding to the control voltage of amplifier 2 shifts from A32 to B32. And the conversion gain hence increases to 180 dB/V as shown in FIG. 3B, and level fluctuation response speed 36 is improved to 60 Hz. Thus, a favorable level-fluctuation-following characteristic is obtainable regardless of the input level.

In the embodiment, from the output of control voltage generator 14, the microprocessor reads the control voltage, but the same effect is obtainable by reading the digital value indicating the control voltage.

(Embodiment 2)

As shown in FIG. 2B, when the operation-starting point of variable gain amplifier 2 and the input level are same at −70 dBm, the level fluctuation response speed is poor at 40 Hz in spite of the high conversion gain of 90 dB/V In this aspect, when a signal whose level fluctuates is input, the operation point shifts to and from between the operation region and non-operation region of variable gain amplifiers 2 and 4. Accordingly, variable gain amplifiers 2 and 4 must be changed over in real time to the level fluctuations. To change over, microprocessor 15 controls control voltage generator 14 by reading the control voltage, and it takes time. And therefore, it is often difficult to respond quickly to the change.

In embodiment 2, when the input level and the operation-starting point of variable gain amplifier 2 are close to each other, a response speed for a level fluctuation of 50 Hz is obtained as shown in FIG. 3B by changing the operation-starting point.

(Embodiment 3)

As shown in FIG. 2A, in the case of the operation-starting point of variable gain amplifier 2 of −70 dBm, when the input level becomes −10 dBm or more, the gain attenuation of variable gain amplifier 2 saturates due to the dynamic range of amplifier 2. And the gain attenuation cannot be changed however the control voltage generator changes the control voltage. In this region, the bit error rate of the digital broadcast receiver degrades extremely.

When detecting the input level of −10 dBm or more by the control voltage for controlling the variable gain amplifier, microprocessor 15 controls control voltage generator 14 to change the operation-starting point of amplifier 2 from −70 dBm to −60 dBm. As a result, the relation of the input level to the gain attenuation becomes as shown in FIG. 3A, so that the input of A/D converter 6 is controlled constantly until the input level becomes 0 dBm.

(Embodiment 4)

Figure 4:
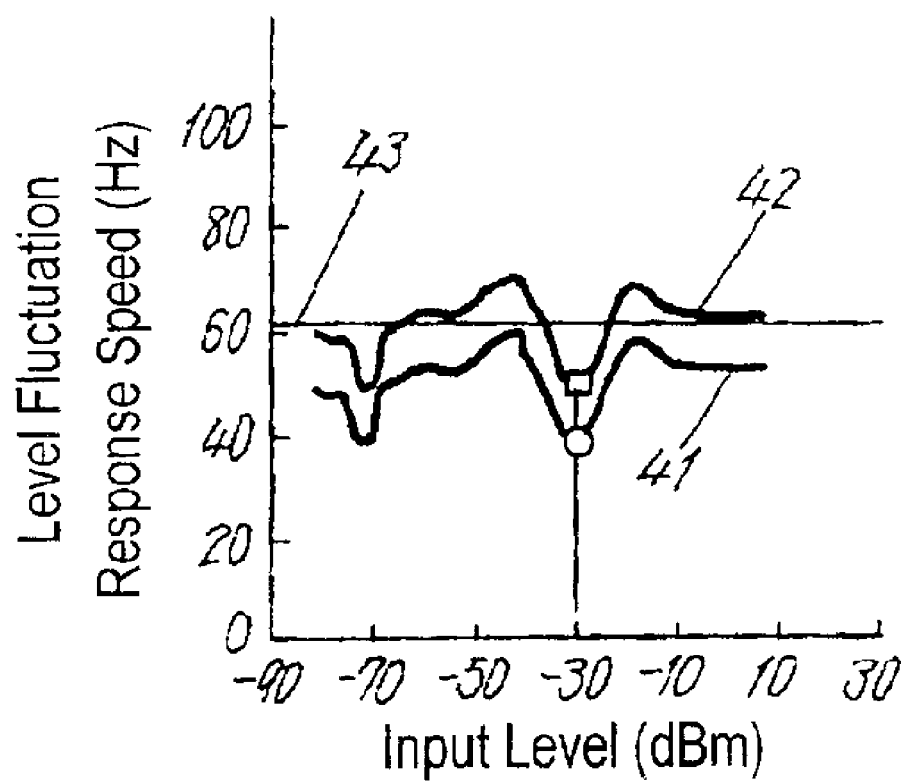
FIG. 4 shows the relation of an input level and a level fluctuation response speed when a bandwidth of a loop filter is changed in the digital signal receiver in embodiment 1 of the invention.

FIG. 4 shows the relation of an input level to a level fluctuation response speed when the bandwidth of the loop filter is changed in a digital signal receiver in the embodiment. Curve 41 shows the case of a narrow bandwidth and curve 42 shows one of a broad bandwidth. As the bandwidth becomes broader, the follow performance is improved, and the level fluctuation response speed is larger.

As the level fluctuation response speed becomes larger, the frequency limit to incoming noise is smaller, and more noise gets into the loop, and the noise characteristic and loop stability are impaired. For example, if the level fluctuation response speed is higher than frequency 43 (62 Hz), there is a problem in a noise characteristic or its stability, but no problem if lower.

In the case that microprocessor 15 reads the input level from the output of control voltage generator 14, if the level is −30 dBm, microprocessor 15 broadens the bandwidth of loop filter 13, and sets the fluctuation response characteristic to curve 42. As a result, the level fluctuation response speed is improved to 50 Hz, and further since it is lower than 60 Hz, high speed is realized under the situation of no problem in noise characteristic or stability. In the case of the input level of −40 dBm, by setting a broad bandwidth, the response speed becomes 70 Hz as indicated by curve 42, and there is a problem in noise characteristic or stability. Therefore, with a narrow bandwidth set, the response speed is set to curve 41. In this case, the response speed is 60 Hz, and there is no problem in noise characteristic or stability.

Thus, in embodiment 4, by setting the bandwidth depending on the input level, the level fluctuation response characteristic can be improved while maintaining favorable stability and noise characteristic.

(Embodiment 5)

Figure 5A:
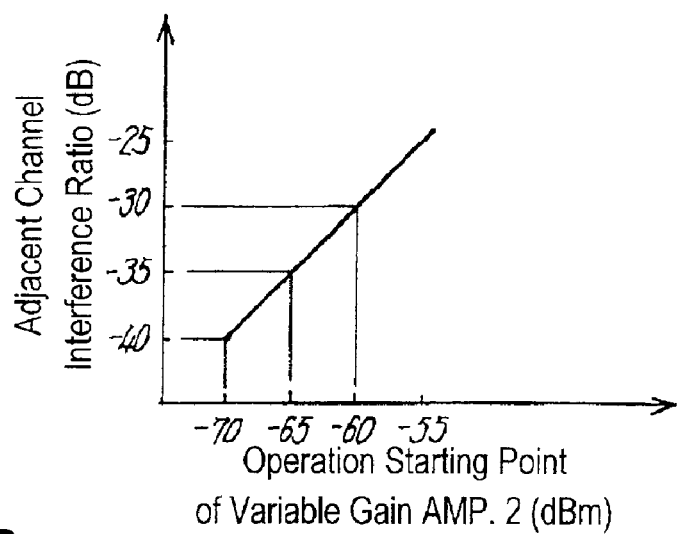
FIG. 5A shows the relation of the operation-starting point of a variable gain amplifier and an adjacent channel interference ratio at the input level of −30 dBm in the digital signal receiver in embodiment 1 of the invention.

FIG. 5A shows the relation between a operation-starting point of variable gain amplifier 2 and a adjacent channel interference ratio at the input level of −30 dBm in a digital signal receiver in embodiment 5. The adjacent channel interference ratio here is a value where a bit error rate is less than a specific one, for example, $3 \times 10^{-6}$. At the operation-starting point of variable gain amplifier 2 of −70 dBm, −65 dBm, and −60 dBm, the adjacent channel interference ratio is respectively −40 dB, −35 dB, and −30 dB.

In embodiment 1, in the case of the average of input signals of −30 dBm, even if the level fluctuation speed of the received signal is not so high, the level fluctuation response characteristic of digital signal receiver is too much improved while the adjacent channel interference ratio characteristic is not so good. In embodiment 5, on the other hand, while minimizing to degrading the adjacent channel interference ratio, the level fluctuation response speed is improved.

Figure 5B:
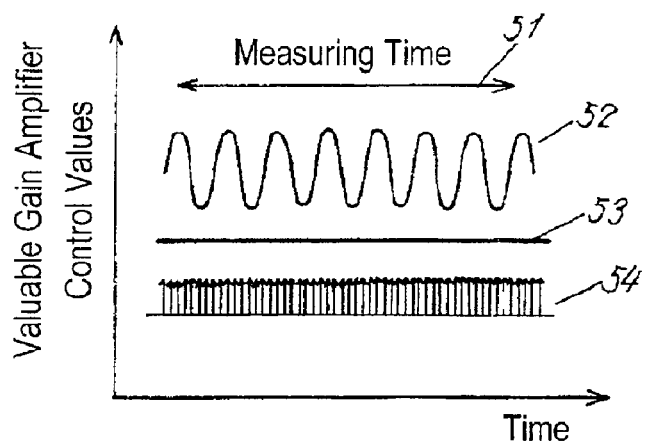
FIG. 5B is an explanatory diagram of a method of calculating a variable frequency from a control value of the variable gain amplifier.

FIG. 5B is a diagram for explaining a method of calculating the fluctuation frequency from a control value for controlling the variable gain amplifier. FIG. 5B shows measuring time 51, control voltage 52 for controlling variable gain amplifier 2, control voltage 53 for controlling variable gain amplifier 4, and sampling points 54 for reading each control voltage value by microprocessor 15. The interval of the sampling points is set sufficiently short with respect to an assumed level fluctuation speed.

When the operation-starting point of variable gain amplifier 2 is −70 dBm and the input level is −30 dBm, the control voltage for controlling variable gain amplifier 2 is constant as indicated by voltage 53. The control voltage for controlling amplifier 2 varies depending on fluctuation of the input signal and becomes, for example, as indicated by voltage 52. The fluctuation frequency is obtained by calculating the number of maximum value peaks of voltage 52 per unit time from measuring time 51. For example, supposing the number of peaks to be forty-two (42) and the measuring time to be one (1) second, the fluctuation frequency is calculated to be 42 Hz. On the basis of this calculation, microprocessor 15 controls the operation-starting point of variable gain amplifier 2 to −65 dBm.

Figure 5C:
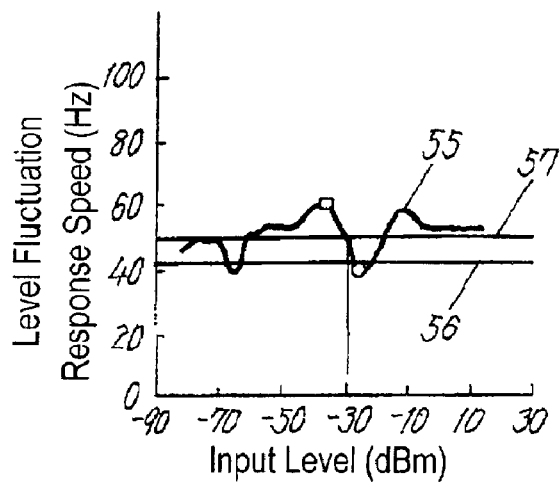
FIG. 5C shows the relation of an input level and a level fluctuation response speed when an operation-starting point of a variable gain amplifier is shifted to −65 dBm.

FIG. 5C shows the relation between the input level and the level fluctuation response speed when the operation-starting point of variable gain amplifier 2 is shifted to −65 dBm. FIG. 5C shows level fluctuation response speed 55, calculated fluctuation frequency 56 (42 Hz), and level fluctuation response speed 57 (50 Hz) at the input level of −30 dBm after the control. In this case, while satisfying a more level fluctuation response speed of 50 Hz than a required level of 42 Hz, the adjacent channel interference ratio of −36 dB is obtained, so that the receiver having an excellent adjacent channel interference characteristic as compared with embodiment 1 is obtained.

Thus, according to embodiment 5, by calculating the fluctuation frequency by the microprocessor, the operation-starting point is shifted so as to satisfy at least the necessary fluctuation response characteristic. The degrading of the adjacent channel interference ratio is suppressed to minimum, and therefore the level fluctuation frequency characteristic is improved.

In embodiment 5, worsening of adjacent channel interference characteristic is kept to minimum by shifting the operation-starting point, but the same effect is obtained by controlling the bandwidth of loop filter.

(Embodiment 6)

Figure 6A:
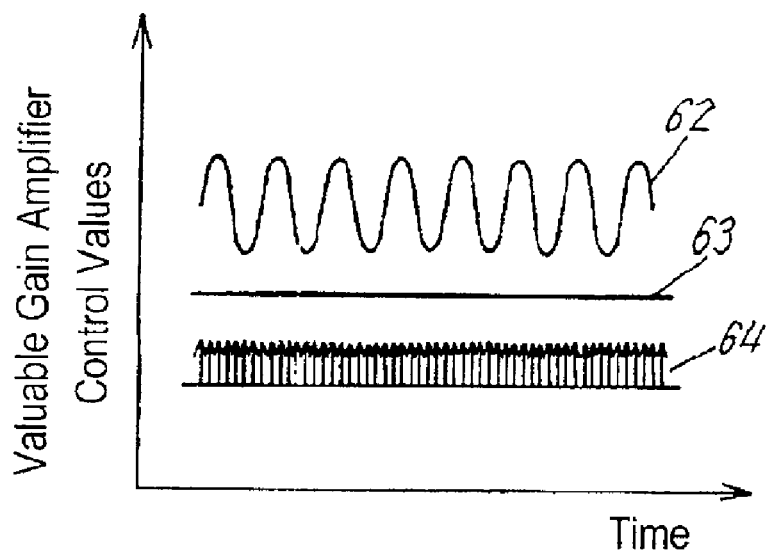
FIG. 6A is an explanatory diagram of a level fluctuation amplitude at an input level of −30 dBm.
Figure 6B:
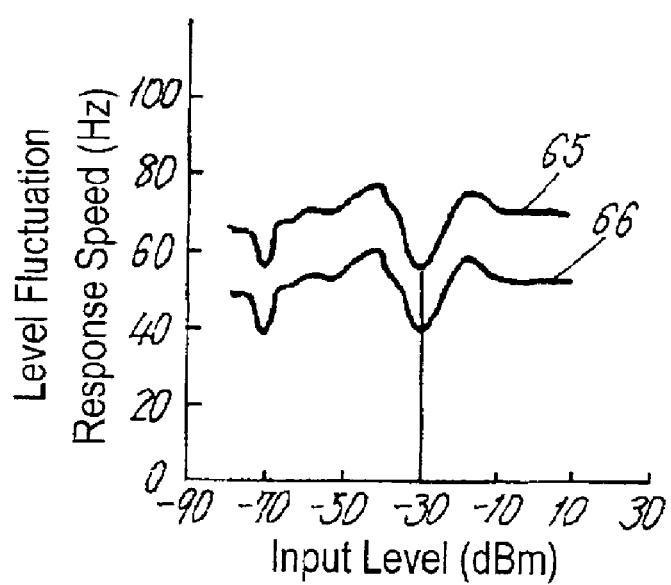
FIG. 6B shows the relation of an operation-starting point of variable gain amplifier, an adjacent channel interference ratio, and a level fluctuation response speed.

FIG. 6A is a diagram for explaining the level fluctuation amplitude at the input level of −30 dBm. FIG. 6B shows the relation between the input level and a level fluctuation response speed when the input level amplitude fluctuation is ±2 dB and ±1 dB in a digital signal receiver in embodiment 6.

FIG. 6A shows control voltage 62 for controlling variable gain amplifier 2, control voltage 63 for controlling variable gain amplifier 4, and sampling points 64 for reading each control value by microprocessor 15. Herein, microprocessor 15 calculates the fluctuation amplitude by selecting the maximum and the minimum values from control voltage 62 for controlling amplifier 2 being read at points 64 and determining the difference between the values.

When the fluctuation amplitude is ±1 dB, the level fluctuation response speed is indicated by curve 65, and when the fluctuation amplitude is ±2 dB, the level fluctuation response speed is indicated by curve 66.

In the case of the input level of −30 dBm, the fluctuation amplitude of ±2 dB, and the level fluctuation response speed of 50 Hz, microprocessor 15, same as in embodiment 1, shifts the operation-starting point of the variable gain amplifier from −70 dBm to −60 dBm. And then, the signal can be received at the level fluctuation response speed of 60 Hz. In the case of the fluctuation amplitude of ±0.5 dB and the level fluctuation response speed of 50 Hz, the operation-starting point is not shifted from −70 dBm.

Thus, in the receiver of this embodiment, by the control with using the level amplitude, if the fluctuation amplitude is small and it is not required to improve the level fluctuation response speed, an excessive control is avoided. Hence, no time for unnecessary control is spent, so that the operation time can be shortened.

(Embodiment 7)

Figure 7A:
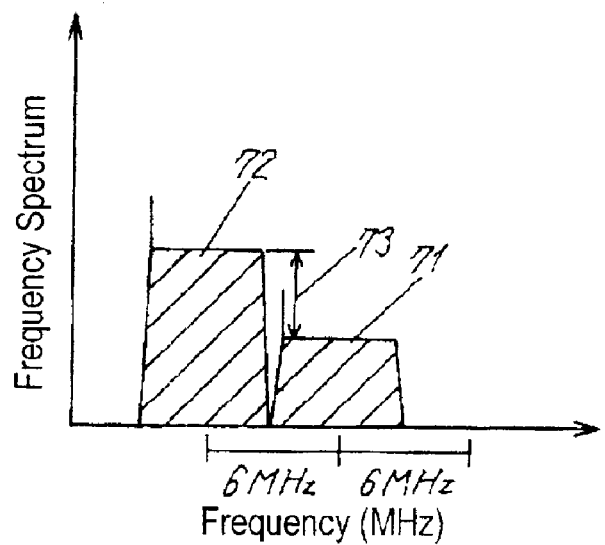
FIG. 7A is a spectrum diagram of a received signal and an adjacent channel interference wave.

FIG. 7A shows spectrums of a received signal and an adjacent channel interference wave, i.e., spectrum 71 of the received signal and spectrum 72 of adjacent channel interference wave at lower frequency side.

Figure 7B:
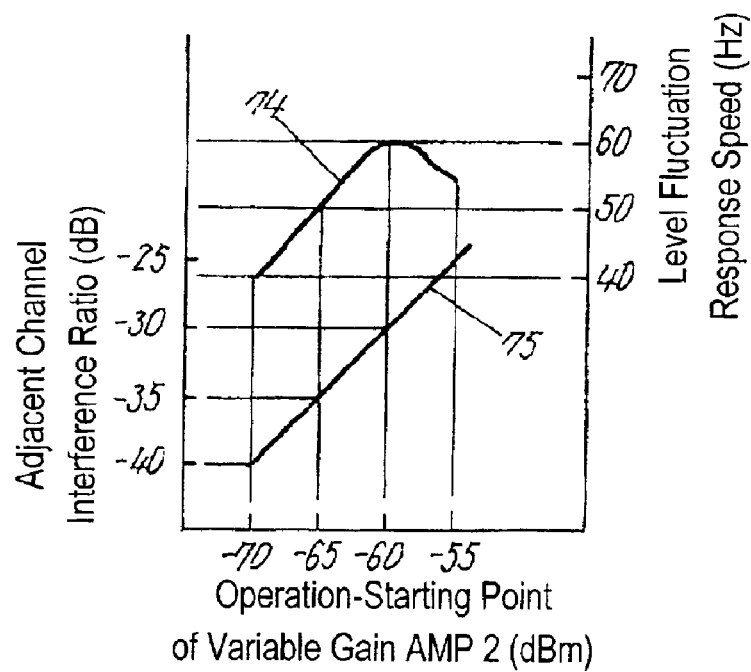
FIG. 7B shows the relation of an operation-starting point of a variable gain amplifier, an adjacent channel interference ratio, and a level fluctuation response speed.

FIG. 7B shows the relation of the operation-starting point of variable gain amplifier 2, the adjacent channel interference ratio, and a level fluctuation response speed. First, microprocessor 15 controls the frequency of local oscillator 10 so that the received signal may be converted in frequency to a specified first intermediate frequency by frequency converter 3. Then, microprocessor 15 calculates the level of received signal from the control voltages for controlling variable gain amplifiers 2 and 4.

Then, microprocessor 15 controls the frequency of local oscillator 10 so that the adjacent channel interference wave of the lower frequency side may be converted in frequency to the specified first intermediate frequency by frequency converter 3. Then, microprocessor 15 calculates the level of adjacent channel interference wave from the control voltages for controlling amplifiers 2 and 4.

In consequence, microprocessor 15 controls the frequency of local oscillator 10 so that the adjacent channel interference wave of the upper frequency side may be converted in frequency to the specified first intermediate frequency by frequency converter 3. Further, microprocessor 15 calculates the level of adjacent channel interference wave from the control voltages for controlling amplifiers 2 and 4. Thus, the level ratio of the received signal and the adjacent channel interference wave is calculated.

In embodiment 7, since there is no interference wave adjacently to the upper frequency side, level ratio 73 of the adjacent channel interference wave of the lower side to the received signal is calculated. When this level ratio is −35 dB, microprocessor 15 sets the operation-starting point of amplifier 2 to −65 dBm. As a result, the adjacent channel interference ratio becomes −35 dB as indicated by curve 75 in FIG. 7B, so that the signal is received without degrading a bit error rate. Further, as indicated by curve 74, the level fluctuation response speed is improved from 40 Hz to 50 Hz.

In this embodiment, by setting the operation-starting point of the variable gain amplifier according to the actual adjacent channel interference ratio, the level fluctuation frequency characteristic is improved while maintaining the required adjacent channel interference ratio.

(Embodiment 8)

Figure 8:
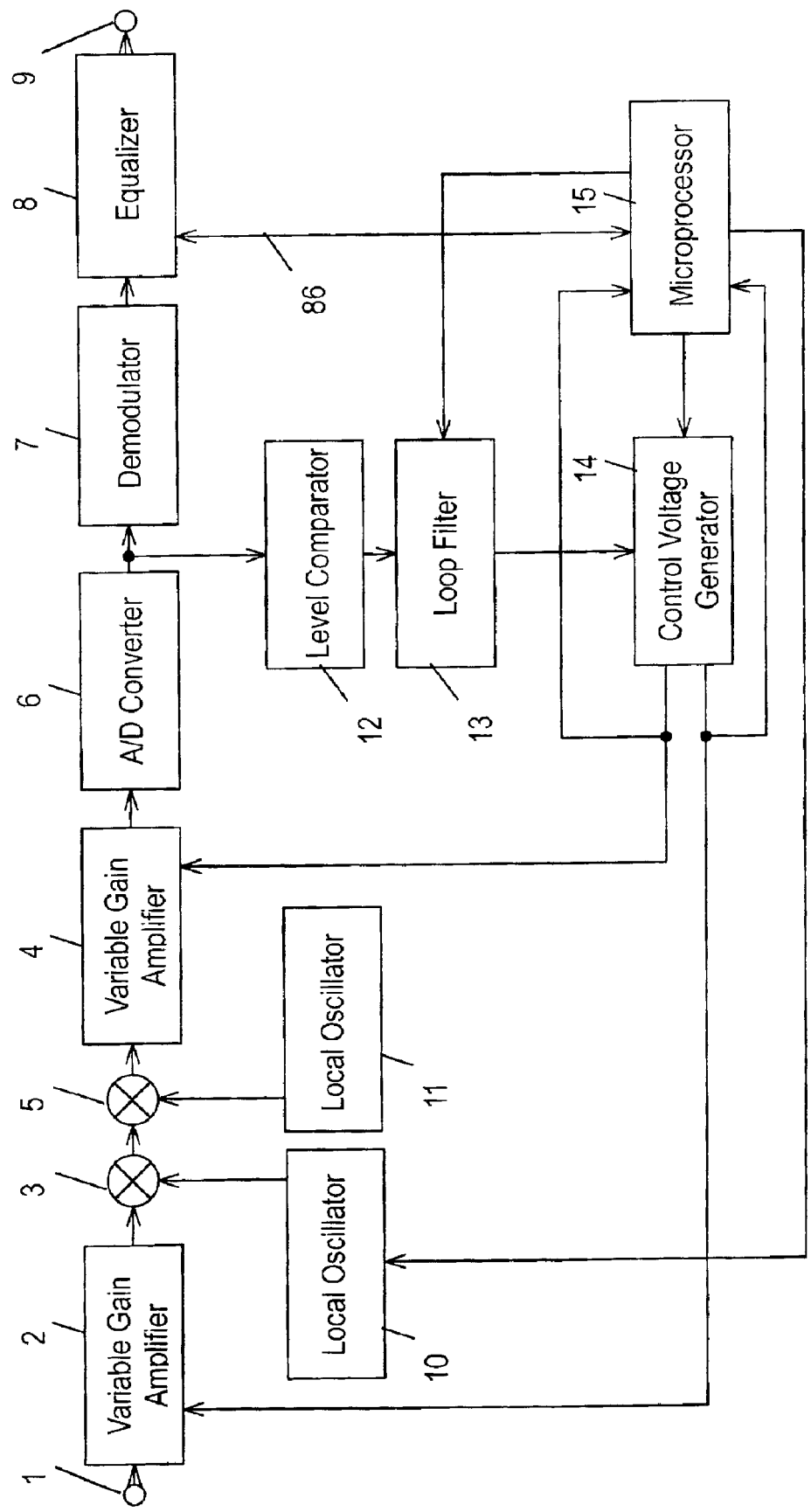
FIG. 8 is a block diagram of a digital signal receiver in embodiment 8 of the invention.
Figure 9:
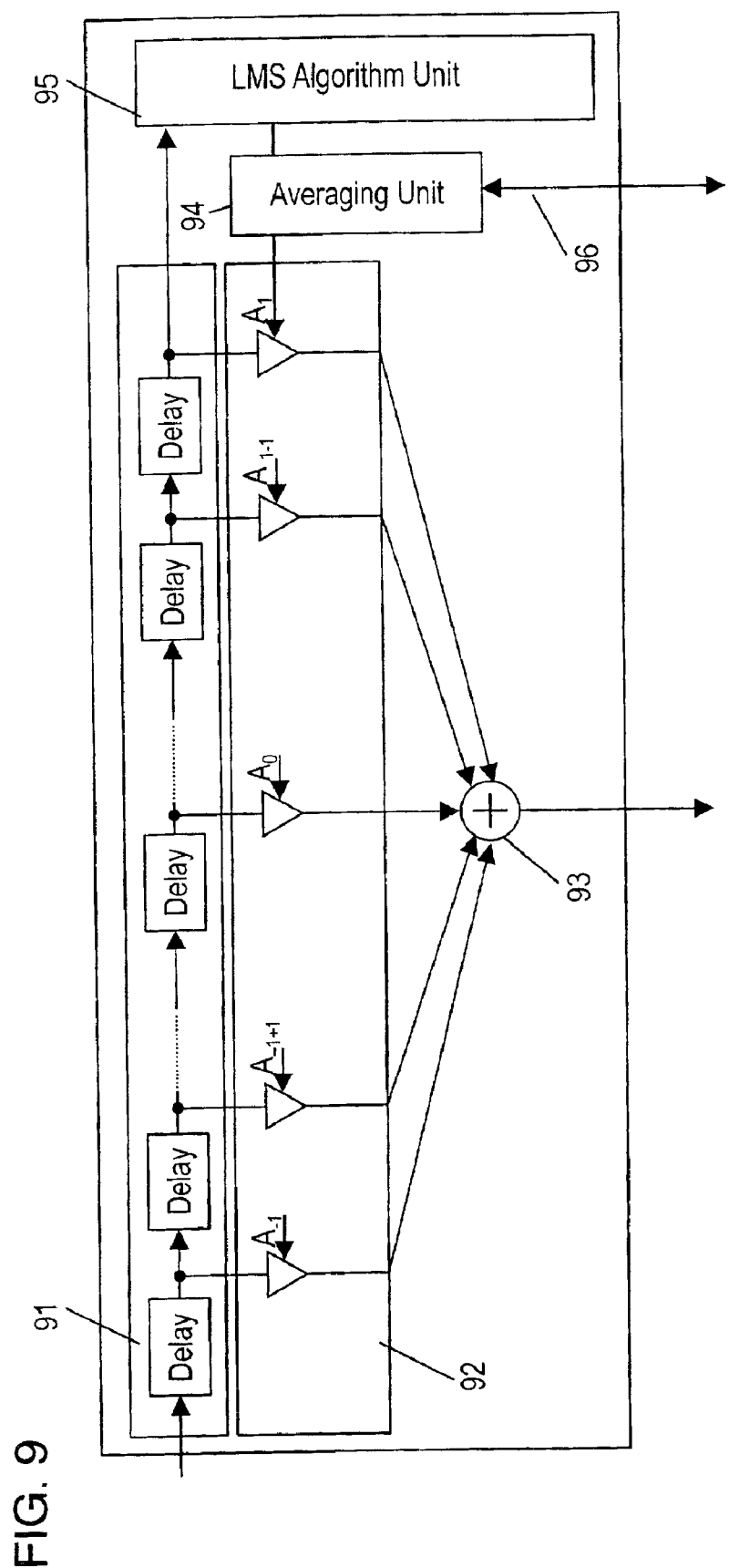
FIG. 9 is a structural diagram of an equalizer in the digital signal receiver in embodiment 8 of the invention.

FIG. 8 is a block diagram of a digital signal receiver in embodiment 8 of the invention, in which an equalizer 8 is used as a ghost detector. FIG. 9 is a structural diagram of equalizer 8.

Equalizer 8 comprises delay unit 91, coefficient unit 92, and adder 93. When the signal containing ghost generated in the transmission line is put into the equalizer, the delay time and energy of ghost are calculated in least mean square (LMS) algorithm unit 95, which is a ghost calculator, and averaged in averaging unit 94, and coefficients of coefficient unit 92, i.e., $A_{-1}, A_{-1+1}, \ldots, A_0, \ldots, A_{1-1}, A_1$ are set. By the digital filter composed of delay unit 91, coefficient unit 92, and adder 93, a distortion due to ghost signal is corrected. Control bus 96 reads coefficients $A_{-1}, A_{-1+1}, \ldots, A_0, \ldots, A_{1-1}, A_1$, and sets the number of times of averaging at averaging unit 94. Bus 96 is indicated by line 86 in FIG. 8.

Figure 10A:
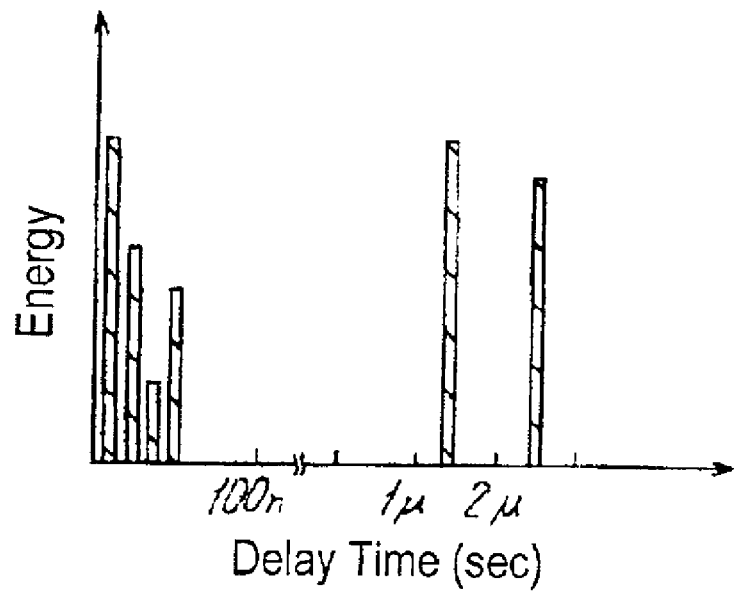
FIG. 10A shows the distribution of a delay time and energy of ghost when received by an indoor antenna.

FIG. 10A shows a distribution of a delay time and energy of ghost calculated from the coefficients when a signal is received with an indoor antenna. When received with an indoor antenna, the signal is reflected in a narrow environment of a room, and hence much ghost occurs in a short delay time of 100 nsec or less.

Figure 10B:
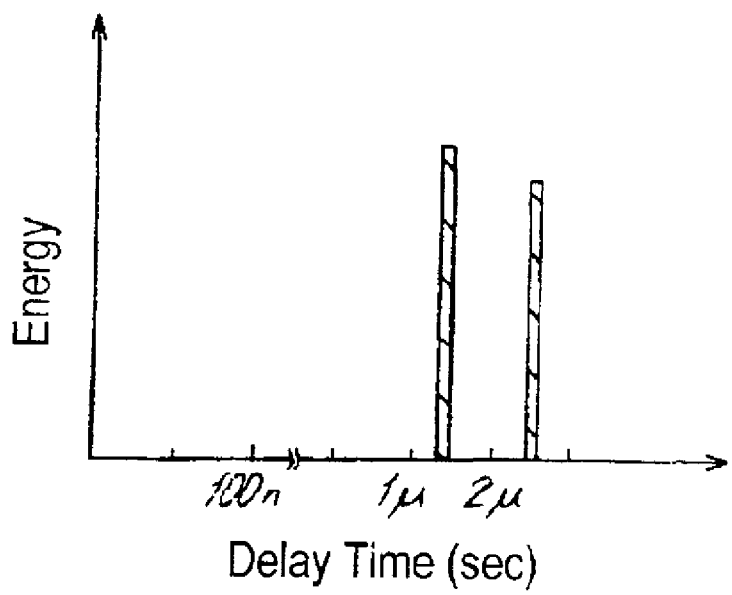
FIG. 10B shows the distribution of a delay time and energy of ghost when received by an indoor antenna.

FIG. 10B shows a distribution of a delay time and energy of ghost when the signal is received with an outdoor antenna. Generally, in the case of an outdoor antenna, since a reflecting object causing ghost exists at a distant place, notable ghost is not occurs within the delay time of 100 nsec. In the case of indoor antenna, a person, which is a reflecting object, often moves in the room, and the ghost signal is moved. If a significant ghost is exists within the delay time of 100 nsec, the number of times of averaging at averaging unit 94 is decreased, and the follow-up performance is improved. And if there is no significant ghost within the time of 100 nsec, the number of times of averaging is increased, and the influence of a noise is reduced and the stability is improved.

Thus, in embodiment 8, judging whether indoor antenna reception or outdoor antenna reception from the distribution of the delay time of ghost, the averaging unit is set so as to be suited to each receiving environment, and therefore the signal can be received stably even if using an indoor antenna.

(Embodiment 9)

When an indoor antenna is used, it is highly possible that a person or an object moving in the radio wave incoming direction or in front of the antenna varies the level of an input signal at high speed. In FIG. 8, when microprocessor 15 judges from the coefficient of equalizer 8 that the signal is received with the indoor antenna, in the case of the input level of −30 dBm, the operation-starting point of variable gain amplifier 2 in FIGS. 2A, 2B is shifted from −70 dBm to −60 dBm shown in FIGS. 3A, 3B, and thereby, the level fluctuation response speed is set from 40 Hz to 60 Hz.

Thus, in embodiment 9, when the signal is received with the indoor antenna, by setting the receiver, the follow-up performance may be improved, and it can be received at an indoor.

(Embodiment 10)

Figure 11:
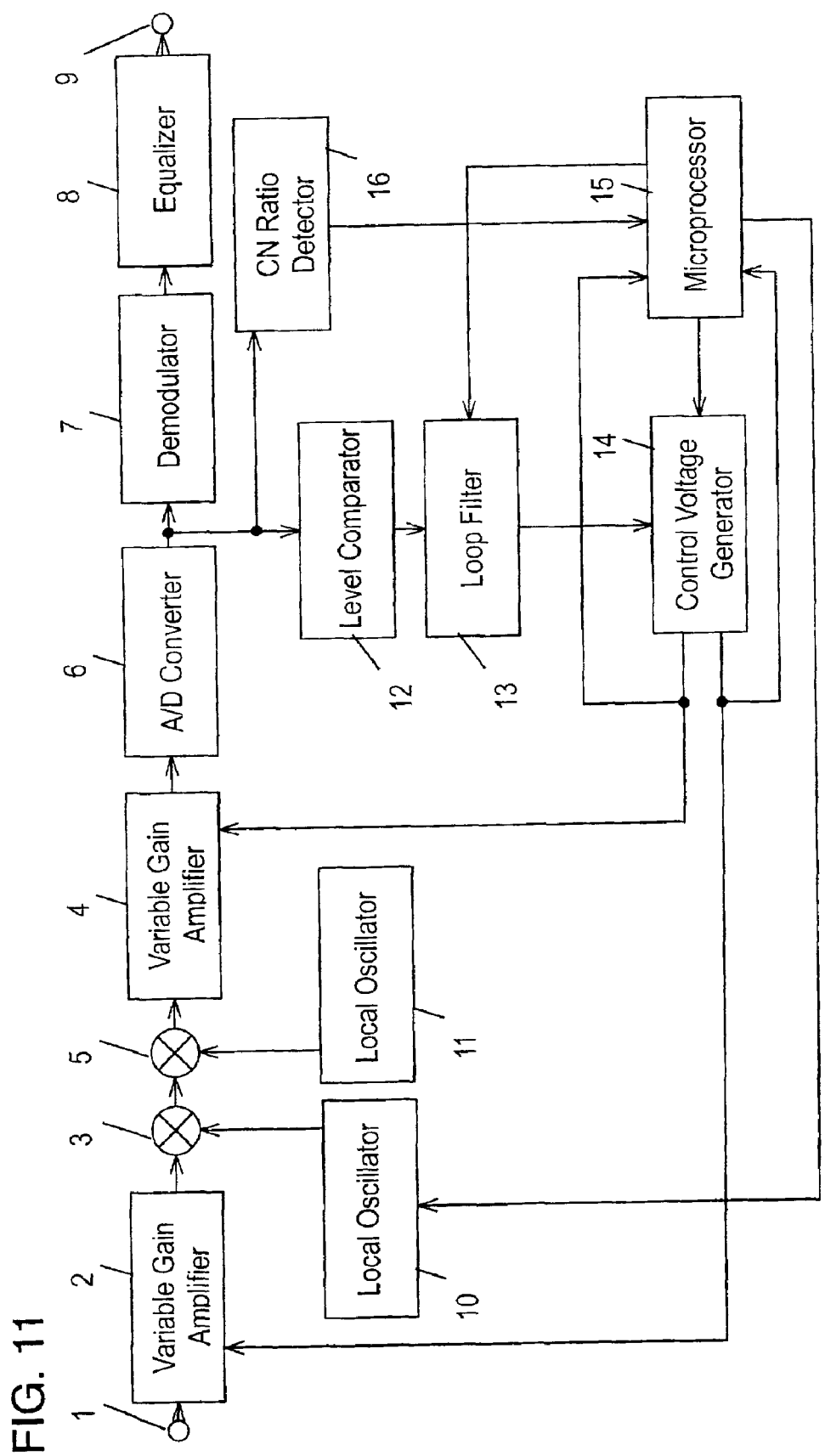
FIG. 11 is a block diagram of a digital signal receiver in embodiment 10 of the invention.
Figure 12:
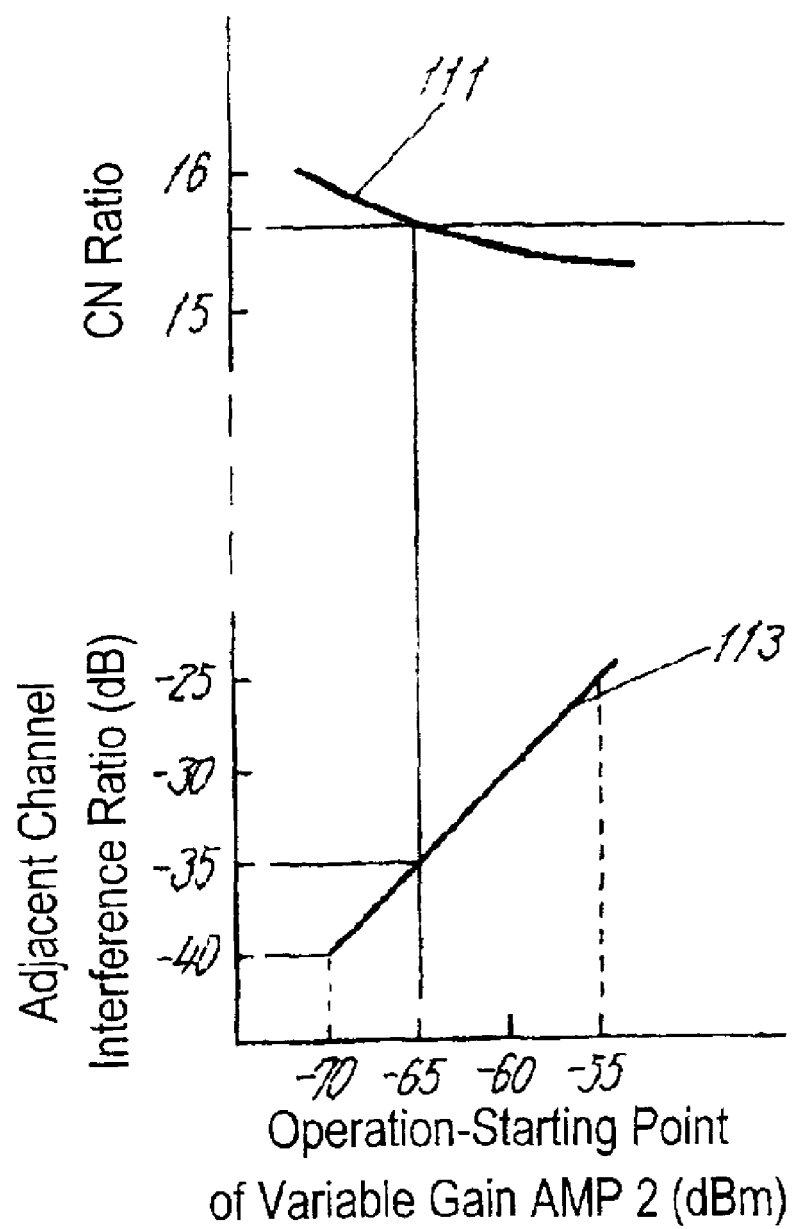
FIG. 12 shows the relation of an adjacent channel interference to a operation-starting point of a variable gain amplifier and a required carrier-noise (CN) ratio.
Figure 13:
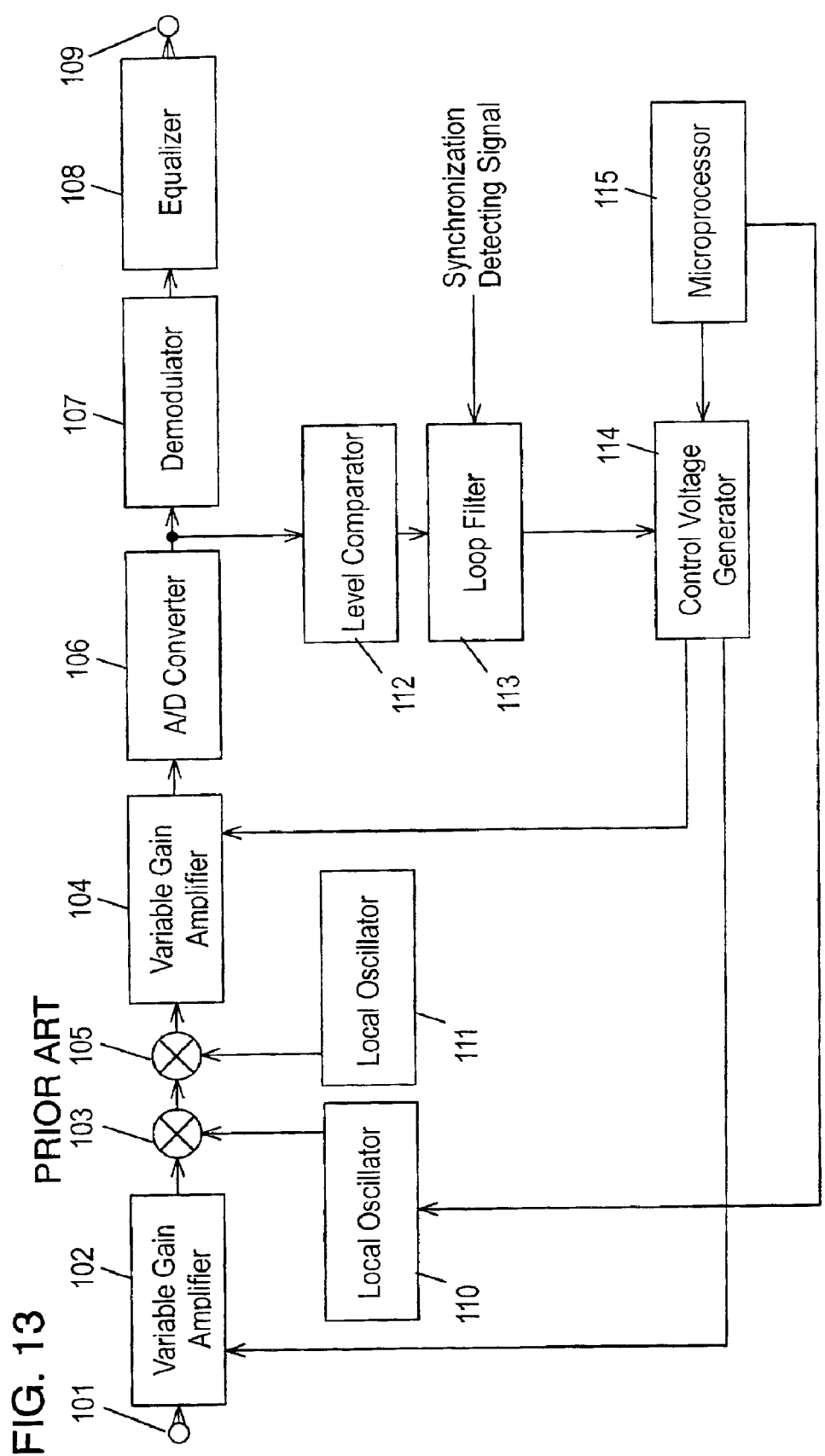
FIG. 13 is a block diagram of a conventional digital signal receiver.

FIG. 11 is a block diagram of a digital signal receiver in embodiment 10. Herein, carrier-to-noise (CN) ratio detector 16 detects the electric power ratio of a signal and a noise of the input signal into A/D converter 6, and microprocessor 15 sets the operation-starting point of variable gain amplifier 2 on the basis of the detected CN ratio. FIG. 12 shows the relation of the adjacent channel interference ratio and required CN ratio corresponding to the operation-starting point of amplifier 2. Usually, except in a weak electric field, an actual CN ratio is high, and there is no problem. When this receiver is incorporated into an appliance such as personal computer, the CN ratio is low, and specified CN ratio may not be maintained.

Actually, supposing the CN ratio at the input of A/D converter 6 to be 15.6 dB, in order that the required CN ratio may be lower than this value, microprocessor 15 shifts the operation-starting point of variable gain amplifier 2, for example, from −70 dBm to −65 dBm. As a result, while the required CN ratio (15.6 dB) is maintained, the adjacent channel interference ratio (−35 dB) may be guaranteed.

Thus, in embodiment 10, by setting the operation-starting point of amplifier 2 while measuring the CN ratio, the same excellent adjacent channel interference ratio is obtainable while satisfying the required CN ratio.

What is claimed is:

1. A digital signal receiver comprising:
   an input terminal for receiving a digital modulation input signal;
   at least two variable gain amplifiers coupled in series to said input terminal for controlling the level of the input signal;
   an analog-to-digital (A/D) converter for receiving an output of said variable gain amplifier;
   a level comparator coupled to an output of said A/D converter for comparing a level of the output of said A/D converter and a reference level;
   a loop filter coupled to said level comparator; and
   a control voltage generator for generating control voltages for controlling said variable gain amplifiers based on an output of said loop filter,
   wherein an operation-starting point of any said variable gain amplifier is shifted using the control voltages when a level fluctuation response speed of any of said variable gain amplifiers is lower than a reference level.

2. A digital signal receiver according to claim 1, wherein the operation-starting point is shifted when the operation-starting point is the same as a level of the input signal.

3. The digital signal receiver according to claim 1, wherein the operation-starting point is shifted when a level of the input signal is at a saturation point of said any of said variable gain amplifiers.

4. A digital signal receiver comprising:
   an input terminal for receiving a digital modulation input signal;
   at least two variable gain amplifiers coupled in series to said input terminal for controlling the level of the input signal;
   an analog-to-digital (A/D) converter for receiving an output of said variable gain amplifier;
   a level comparator coupled to an output of said A/D converter for comparing a level of the output of said A/D converter and a reference level;
   a loop filter coupled to said level comparator; and
   a control voltage generator for generating control voltages for controlling said variable gain amplifiers based on an output of said loop filter,
   wherein the operation-starting point is shifted based on an average of the control voltage for said any of said variable gain amplifiers and a fluctuation frequency of the control voltage for said any of said variable gain amplifiers.

5. A digital signal receiver comprising:
   an input terminal for receiving a digital modulation input signal;
   at least two variable gain amplifiers coupled in series to said input terminal for controlling the level of the input signal;
   an analog-to-digital (A/D) converter for receiving an output of said variable gain amplifier;
   a level comparator coupled to an output of said A/D converter for comparing a level of the output of said A/D converter and a reference level;
   a loop filter coupled to said level comparator; and
   a control voltage generator for generating control voltages for controlling said variable gain amplifiers based on an output of said loop filter,
   wherein the operation-starting point is shifted based on an average of the control voltage for said any of said variable gain amplifiers and a level fluctuation amplitude of the input signal.

6. A digital signal receiver comprising:
   an input terminal for receiving a digital modulation input signal;
   at least two variable gain amplifiers coupled in series to said input terminal for controlling the level of the input signal;
   an analog-to-digital (A/D) converter for receiving an output of said variable gain amplifier;
   a level comparator coupled to an output of said A/D converter for comparing a level of the output of said A/D converter and a reference level;
   a loop filter coupled to said level comparator; and
   a control voltage generator for generating control voltages for controlling said variable gain amplifiers based on an output of said loop filter,
   wherein the operation-starting point is shifted based on the control voltage for said any of said variable gain amplifiers and an electric power ratio of an adjacent channel and a desired channel.

7. A digital signal receiver comprising:
   an input terminal for receiving a digital modulation input signal;
   at least two variable gain amplifiers coupled in series to said input terminal for controlling the level of the input signal;
   an analog-to-digital (A/D) converter for receiving an output of said variable gain amplifier;
   a level comparator coupled to an output of said A/D converter for comparing a level of output of said A/D converter and a reference level;
   a loon filter coupled to said level comparator; and
   a control voltage generator for generating control voltages for controlling said variable gain amplifiers based on an output of said loop filter,
   wherein the bandwidth is controlled based on average values of the control voltages and fluctuation frequencies of the control voltages.

8. A digital signal receiver comprising:
   an input terminal for receiving a digital modulation input signal;
   at least two variable gain amplifiers coupled in series to said input terminal for controlling the level of the input signal;
   an analog-to-digital (A/D) converter for receiving an output of said variable gain amplifier;
   a level comparator coupled to an output of said A/D converter for comparing a level of the output of said A/D converter and a reference level;
   a loon filter coupled to said level comparator; and
   a control voltage generator for generating control voltages for controlling said variable gain amplifiers based on an output of said loon filter,
   wherein the bandwidth is controlled based on average values of the control voltages and a level fluctuation amplitude of the input signal.

9. A digital signal receiver comprising:
   an input terminal for receiving a digital modulation input signal;
   a variable gain amplifier coupled to said input terminal for controlling a level of the input signal;

an analog-to-digital (A/D) converter for receiving an output of said variable gain amplifier;

a level comparator coupled to an output of said A/D converter for comparing a level of the output of said A/D converter and a reference level;

a loop filter coupled to said level comparator;

a control voltage generator for generating control voltages for controlling said variable gain amplifier based on an output of said loop filter, a demodulator for demodulating an output of said A/D converter, and a ghost detector coupled to an output of said demodulator for detecting a delay time of ghost, comprising:
  a delay unit for delaying the output of said demodulator,
  a ghost calculator for calculating the delay time and an energy of ghost,
  a coefficient unit, and
  an averaging unit for calculating a coefficient of said coefficient unit,
  wherein a number of times of averaging at said averaging unit is controlled based on the delay time.

10. A digital signal receiver comprising:

an input terminal for receiving a digital modulation input signal;

a variable gain amplifier coupled to said input terminal for controlling a level of the input signal;

an analog-to-digital (A/D) converter for receiving an output of said variable gain amplifier;

a level comparator coupled to an output of said A/D converter for comparing a level of the output of said A/D converter and a reference level;

a loop filter coupled to said level comparator;

a demodulator for demodulating the output of said A/D converter; and a ghost detector coupled to an output of said demodulator for calculating a delay time of ghost;

wherein an operation-starting point of said variable gain amplifier is shifted based on the delay time.

11. The digital signal receiver according to claim 10, further comprising a control voltage generator for generating a control voltage for controlling said variable gain amplifier from an output of said loop filter.

12. A digital signal receiver comprising:

an input terminal for receiving a digital modulation input signal;

a variable gain amplifier coupled to said input terminal for controlling a level of the input signal;

an analog-to-digital (A/D) converter for receiving an output of said variable gain amplifier;

a level comparator coupled to an output of said A/D converter for comparing a level of the output of said A/D converter and a reference level;

a loop filter connected to said level comparator;

a demodulator for demodulating the output of said A/D converter; and a ghost detector connected to an output of said demodulator for calculating a delay time of ghost;

wherein a bandwidth of said loop filter is controlled based on the delay time.

13. A digital signal receiver comprising:

an input terminal for receiving a digital modulation input signal;

a variable gain amplifier coupled to said input terminal for controlling a level of the input signal;

an analog-to-digital (A/D) converter for receiving an output of said variable gain amplifier;

a level comparator coupled to an output of said A/D converter for comparing a level of the output of said A/D converter and a reference level;

a loop filter coupled to said level comparator; and a carrier-to-noise (CN) ratio detector coupled to the output of said A/D converter for detecting a carrier-to-noise (CN) ratio of an input signal into said A/D converter;

wherein an operation-starting point of said variable gain amplifier is shifted based on the CN ratio.

14. The digital signal receiver according to claim 13, further comprising a control voltage generator for generating a control voltage for controlling said variable gain amplifier from an output of said loop filter.

15. A digital signal receiver comprising:

an input terminal for receiving a digital modulation input signal;

a variable gain amplifier coupled to said input terminal for controlling a level of the input signal;

an analog-to-digital (A/D) converter for receiving an output of said variable gain amplifier;

a level comparator coupled to an output of said A/D converter for comparing a level of the output of said A/D converter and a reference level;

a loop filter coupled to said level comparator; and a carrier-to-noise (CN) ratio detector coupled to the output of said A/D converter for detecting a carrier-to-noise (CN) ratio of an input signal into said A/D converter;

wherein a bandwidth of said loop filter is controlled based on the CN ratio.

16. The digital signal receiver according to claim 15, further comprising a control voltage generator for generating a control voltage for controlling said variable gain amplifier from an output of said loop filter.

* * * * *